(12) United States Patent
Lee et al.

(10) Patent No.: US 9,510,725 B2
(45) Date of Patent: Dec. 6, 2016

(54) DISHWASHER AND METHOD OF CONTROLLING THE SAME

(71) Applicant: LG ELECTRONICS INC., Seoul (KR)

(72) Inventors: Youmin Lee, Seoul (KR); Soohan Eo, Seoul (KR); Jongmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 60 days.

(21) Appl. No.: 14/179,308

(22) Filed: Feb. 12, 2014

(65) Prior Publication Data

US 2014/0261576 A1 Sep. 18, 2014

(30) Foreign Application Priority Data

Feb. 12, 2013 (KR) ........................ 10-2013-0015020

(51) Int. Cl.
*A47L 15/42* (2006.01)

(52) U.S. Cl.
CPC ............ *A47L 15/4221* (2013.01); *A47L 15/42* (2013.01); *A47L 15/4214* (2013.01); *A47L 15/4217* (2013.01); *A47L 15/4219* (2013.01); *A47L 15/4291* (2013.01); *A47L 15/4229* (2013.01); *A47L 2401/09* (2013.01); *A47L 2401/20* (2013.01); *A47L 2501/03* (2013.01); *A47L 2501/05* (2013.01); *Y02B 40/42* (2013.01); *Y02B 40/44* (2013.01); *Y02B 40/46* (2013.01)

(58) Field of Classification Search
CPC .. A47L 15/42; A47L 15/4214; A47L 15/4217; A47L 15/4219; A47L 15/4221; A47L 15/4229;A47L 15/4291; A47L 2401/09; A47L 2401/20; A47L 2501/03; A47L 2501/05; Y02B 40/42; Y02B 40/44; Y02B 40/46
USPC ................... 134/56 D, 57 D, 58 D, 111, 186
See application file for complete search history.

(56) References Cited

U.S. PATENT DOCUMENTS

| | | | |
|---|---|---|---|
| 5,546,969 A | 8/1996 | Vilen | |
| 2005/0241675 A1* | 11/2005 | Jung | ................... A47L 15/4244 134/18 |
| 2005/0284506 A1 | 12/2005 | Lee | |
| 2008/0011339 A1 | 1/2008 | Ryu et al. | |
| 2008/0041419 A1 | 2/2008 | Gaus | .............................. 134/10 |

(Continued)

FOREIGN PATENT DOCUMENTS

| | | |
|---|---|---|
| CN | 1706338 A | 12/2005 |
| CN | 1950016 A | 4/2007 |

(Continued)

OTHER PUBLICATIONS

United Kingdom Search Report dated Aug. 6, 2014, issued in Application No. GB1402336.0.

(Continued)

*Primary Examiner* — Michael Barr
*Assistant Examiner* — Levon J Shahinian
(74) *Attorney, Agent, or Firm* — KED & Associates LLP

(57) ABSTRACT

A dishwasher is provided. The dishwasher may include a case, a tub provided in the case and forming a dishwashing space, a re-using section provided inside the case and forming a space for storing wash water to be sprayed into the tub, and a water storing section provided inside the case and forming another space, separated from the re-using section, for storing externally supplied wash water.

16 Claims, 13 Drawing Sheets

(56) References Cited

U.S. PATENT DOCUMENTS

2011/0114140 A1* 5/2011 Heisele ............... A47L 15/0015
  134/56 D
2012/0260942 A1* 10/2012 Slabbekoorn ....... A47L 15/0031
  134/10

FOREIGN PATENT DOCUMENTS

| CN | 101103889 A | 1/2008 |
|---|---|---|
| EP | 2 465 405 A2 | 6/2012 |
| EP | 2 478 817 A1 | 7/2012 |
| EP | 2 764 815 A1 | 8/2014 |
| GB | 2509617 A | 7/2014 |
| GB | 2512987 A | 10/2014 |
| WO | WO 2013/143619 A1 | 10/2013 |

OTHER PUBLICATIONS

Chinese Office Action for Application 201410048804.9 dated Mar. 22, 2016 (full Chinese text).

* cited by examiner

P100

DISHWASHER AND METHOD OF CONTROLLING THE SAME

CROSS-REFERENCE TO RELATED APPLICATION(S)

This application claims priority under 35 U.S.C. §119 to Korean Application No. 10-2013-0015020 filed in Korea on Feb. 12, 2013, whose entire disclosure is hereby incorporated by reference.

BACKGROUND

1. Field

This relates to a dishwasher and a method of controlling the same.

2. Background

Dishwashers may remove debris from dishes and the like using high-pressure wash water sprayed from wash arms. Dishwashers may include a tub forming a cleaning compartment and a sump provided at the bottom of the tub. The wash water may be pumped to wash arms by a wash pump provided in the sump and sprayed at high pressure through ejection holes formed in the wash arms onto dishes received in the tub so that debris such as food residue is released from the dishes falls to the bottom of the tub. The used wash water may be separated from the debris and collected for discharge to the outside.

BRIEF DESCRIPTION OF THE DRAWINGS

The embodiments will be described in detail with reference to the following drawings in which like reference numerals refer to like elements wherein.

DETAILED DESCRIPTION

Figure 1:
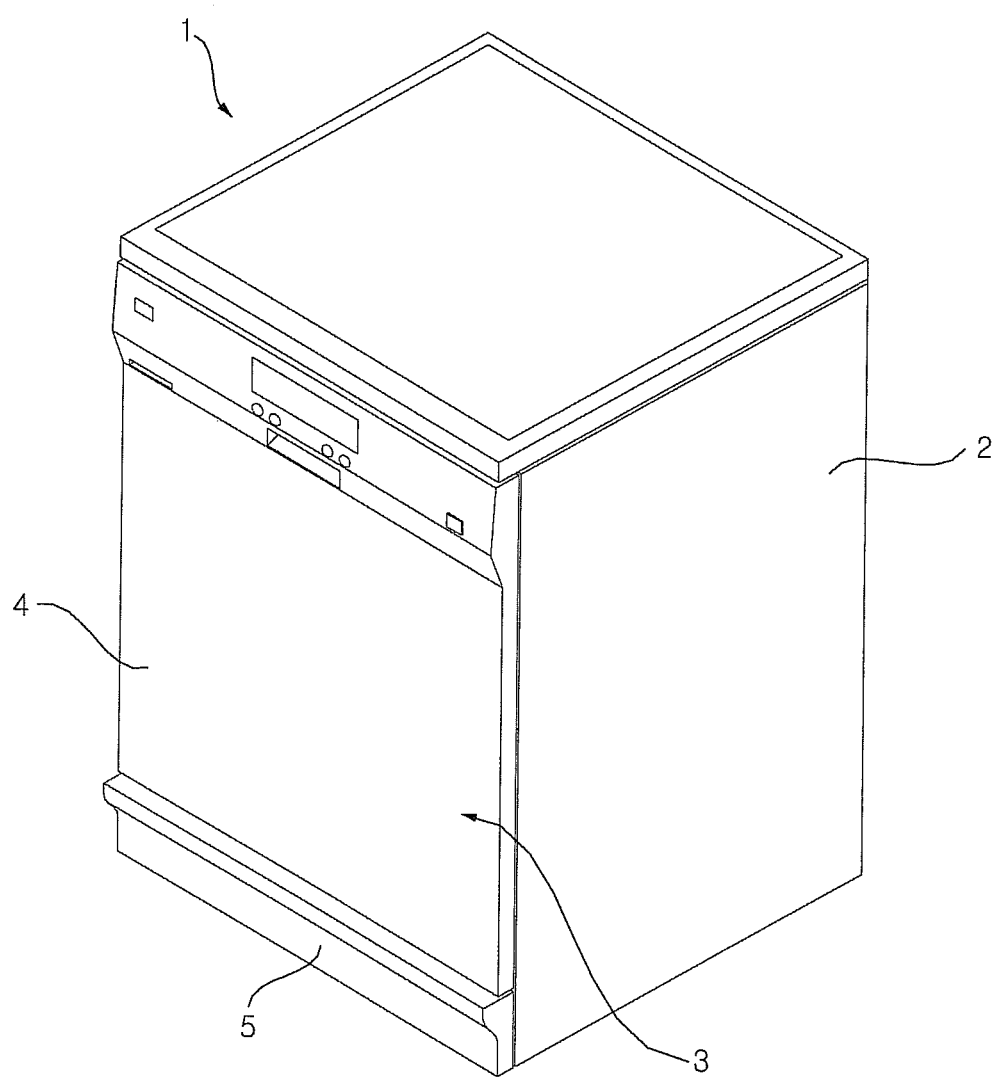
FIG. 1 is a perspective view of a dishwasher according to an exemplary embodiment.

The advantages and features will be clear by referring to various exemplary embodiments that will be described hereafter in detail with reference to the accompanying drawings. However, embodiments are not limited to the exemplary embodiments described hereafter and may be implemented in various ways, and the exemplary embodiments are provided to complete the description and convey to those skilled in the art the scope as broadly described herein. Like reference numerals indicate like components throughout the specification.

In many dishwashers, the wash water is used only one time and then discharged. This may use an excessive amount of wash water. In certain embodiments as broadly described herein, wash water may be recycled in order to use less wash water.

Referring to FIGS. 1 to 4, a dishwasher 1 according to an exemplary embodiment as broadly described herein may include a tub 10 defining a dishwashing space, a case 100 disposed outside the tub 10 and storing wash water, a recycling section 110 disposed inside the case 100 and defining a space for storing the wash water to be sprayed back into the tub 10, and a water storing section 120 disposed inside the case 100, defining another space, separated from the recycling section 110, and storing wash water supplied from an external source.

A cabinet 2 may define an exterior of the dishwasher 1 and provides a structure for accommodating various components of the dishwasher 1. The front of the cabinet 2 is open. The tub 10 into which wash water is sprayed is disposed in the cabinet 2. A user puts dishes into the tub 10. A door 3 opens/closes the front of the cabinet 2. The door 3 closes the tub 10. The door 3 is pivotably coupled to the front of the cabinet 2. A front cover 4 may be disposed on the front of the door 3.

A lower cover 5 is disposed under the door 3. The tub 10 is disposed inside the cabinet 2. The front of the tub 10 is closed by the door 3. Wash water is sprayed into the tub 10. A wash arm 20 spraying wash water into the tub 10 is disposed in the tub 10. A rack that holds dishes is disposed in the tub 10. The rack can move forward/backward in the tub 10. A plurality of racks may be provided.

The rack includes a top rack 11 and a bottom rack 13. The wash water sprayed into the tub 10 collects into the sump 60. A filter assembly 50 filters foreign substances in wash water. A drain pipe 71 is connected with the sump 60. The drain pipe 71 is provided to discharge the water collected in the sump 60 to the outside. The drain pipe 71 is connected with a drain pump 70. The drain pump 70 pressurizes and sends wash water to the drain pipe 71.

The sump 60 is supplied with wash water from an external source. The sump 60 is connected with a wash arm pipe 30 through which the wash water flows to the wash arm 20. The sump 60 is disposed at the bottom of the tub 10. The sump 60 is equipped with the filter assembly 50 filtering foreign substances in wash water. The case 100 is disposed outside the tub 10. The case 100 may be fastened to a side of the tub 10. In an exemplary embodiment, the case 100 is fastened to a side of the tub 10.

The recycling section 110 is formed inside the case 100. The recycling section 110 may be defined by walls inside the case 100. The recycling section 110 stores the wash water flowing from the sump 60 after being collected in the sump 60. The recycling section 110 discharges the stored wash water back to the sump 60. The recycling section 110 may be connected with a recycling pipe 150. The recycling pipe 150 is a pipe that is disposed between the recycling section 110 and the sump 60 and through which wash water flows.

The water storing section 120 is formed inside the case 100. The water storing section 120 may be defined by walls. The water storing section 120 is separated from the recycling section 110. The water storing section 120 stores wash water supplied from the external source. The water storing section 120 may be connected with a water supply pipe 41. The water supply pipe 41 is a pipe through which water supplied from the external source, such as, for example, water equipment of a house flows. The water storing section 120 is connected with a supply pipe connection port 130. The supply pipe connection port 130 is a pipe through which the wash water in the water storing section 120 flows to the sump 60.

The case 100 may have two sides, of which either one is fastened to the tub 10 and the other covers it. A communicating hole 100a may be formed through the side fastened to the tub 10. The supply pipe connection port 130 will be described in detail below.

The wash pump 45 pressurizes and sends the wash water in the sump 60 to the wash arm pipe 30. The wash arm pipe 30 is connected with the wash arm 20. The wash arm 20 includes nozzles spraying wash water. The wash water sprayed from the wash arm 20 washes dishes. The wash arm pipe 30 is connected with the wash pump 45. A plurality of wash arms 20 may be provided at predetermined heights.

For example, the wash arm 20 may include an upper arm 21 at the highest position, a lower arm 25 at the lowest position, and a middle arm 23 between the upper arm 21 and the lower arm 25. The wash arm pipe 30 may include an upper arm pipe 31, a middle arm pipe 33, and a lower arm pipe 35. The upper arm 21 receives wash water through the upper arm pipe 31 from the wash pump 45. The middle arm 23 receives wash water through the middle arm pipe 33 from the wash pump 45. The lower arm 25 receives wash water through the lower arm pipe 35 from the wash pump 45.

The wash water discharged from the wash pump 45 can be guided to at least one of the wash arm pipes 30 by a flow switch 320. The flow switch 320 is disposed between the wash arm pipes 30 and the wash pump 45. The case 100 can be divided into a front and a rear portion. The front and the rear may be symmetrically formed, in which walls may be formed on any one of them and the other one may have a sealing shape for preventing wash water from flowing in unintended directions, corresponding to the walls. A plurality of ribs 201 is disposed inside the case 100. The ribs 201 maintain the external shape of the case 100. The ribs 201 are shaped such that they are in contact with the front and the rear of the case 100.

Fastening members 190 may fix the case 100 to the tub 10, the case 100 may have fastening holes 191 in which the fastening members 190 are inserted, and waterproofing walls 193 formed in the radial direction of the fastening holes 191 may be disposed around the fastening holes 191 to prevent the wash water in the recycling section 110 or the water storing section 120 from leaking.

The fastening members 190 may be screws or bolts. The waterproofing wall 193 prevents the fastening member 190 from coming in contact with wash water. The waterproofing wall 193 isolates the recycling section 110 and/or the water storing section 120 and the fastening hole 191 such wash water does not leak through the fastening hole 191. The fastening holes 191 and the waterproofing walls 193 may be formed at the recycling section 110.

The front of the tub 10 is open so that dishes can be received therein. The door 3 that can pivot forward/backward is disposed in front of the tub 10. The door 3 opens/closes the open front of the tub 10. An input device 310 is disposed in front of the tub 10. The case 100 is disposed on the right side or the left side of the tub 10. A tub hole 10a is formed through the right side or the left side of the tub 10. The tub hole 10a may be formed through the side of the tub 10 on which the case 100 is disposed.

The cabinet 2 covers the tub 10 and the case 100. The case 100 is disposed inside the cabinet 2. One side of the case 100 faces the tub 10 and the other side faces the inside of the cabinet 2. The case 100 is inserted in the space between the cabinet 2 and the side of the tub 10. The case 100 is relatively small in thickness and may be wide enough to correspond to the left side or the right side of the tub 10.

Figure 5:
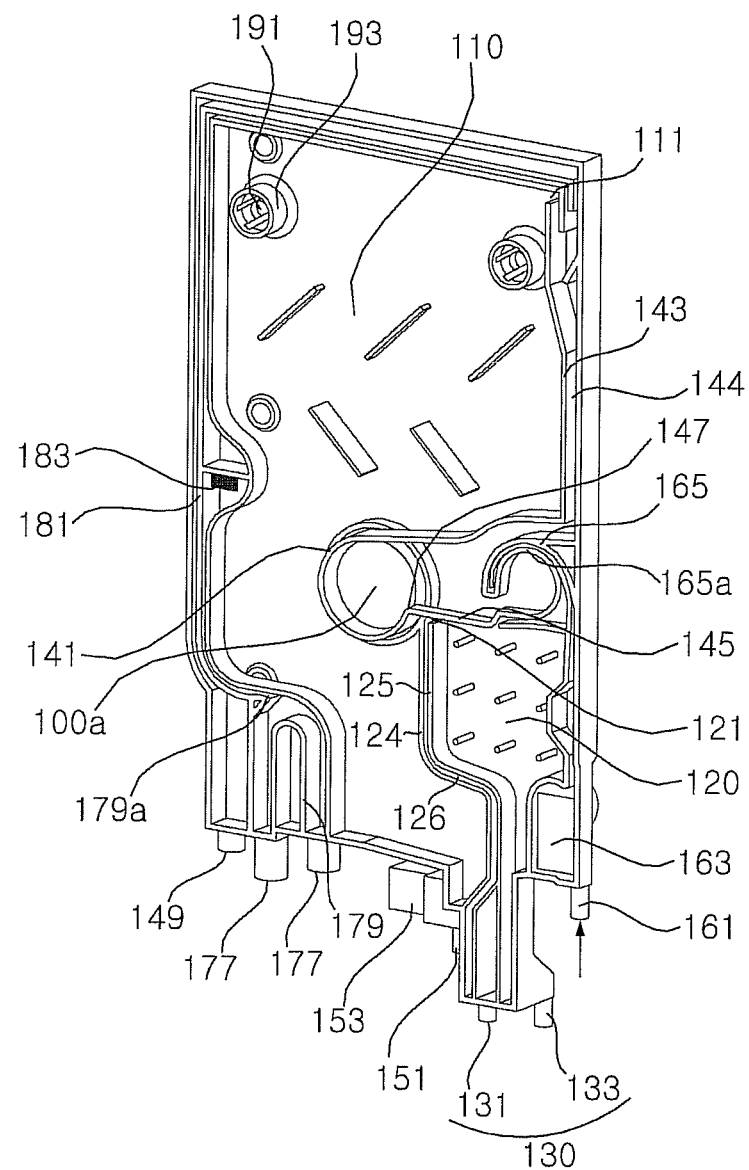
FIG. 5 is a perspective view of an internal portion of the case.
Figure 6:
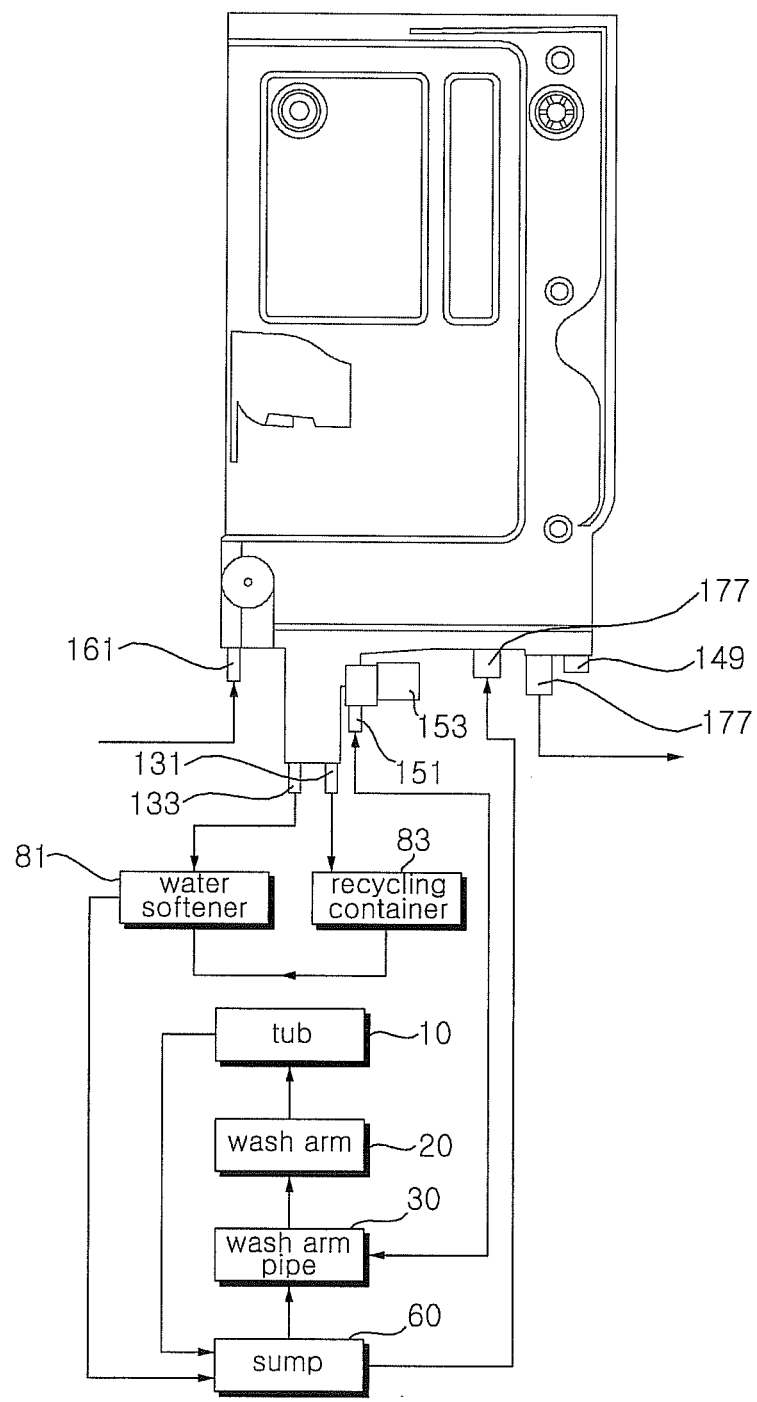
FIG. 6 illustrates a flow of wash water through the case and the other components, according to an exemplary embodiment.
Figure 7A:
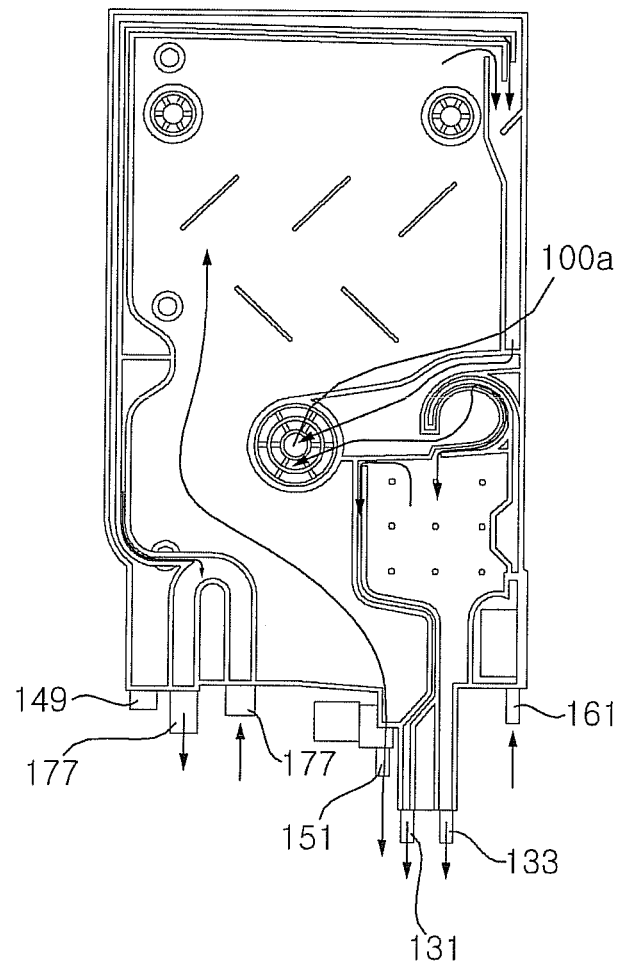
FIG. 7A illustrates the flow direction of wash water inside the case according to an exemplary embodiment and FIG. 7B illustrates a flow direction of air inside the case.
Figure 7B:
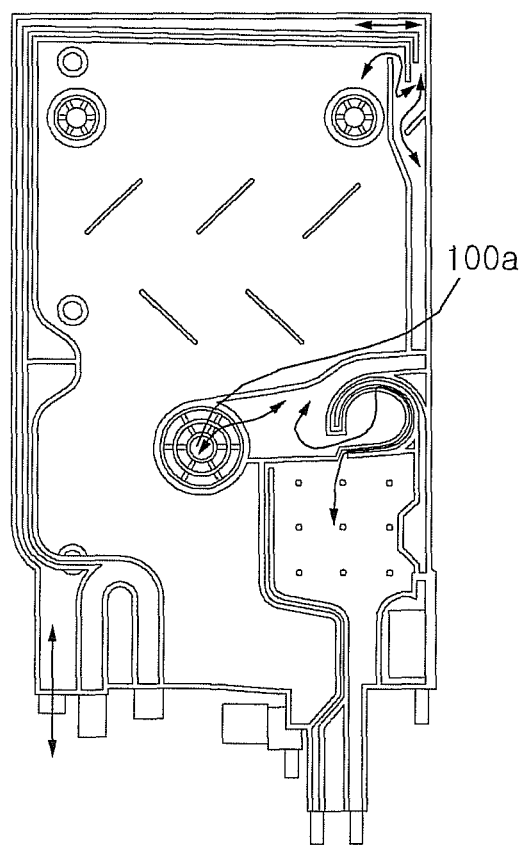

Referring to FIGS. 5 to 7, the recycling section 110 and the water storing section 120 are spaced from each other and an overflow channel 126 is formed between the recycling section 110 and the water storing section 120, such that the wash water overflowing from the water storing section 120 due to oversupplying can be discharged out of the case 100 through the overflow channel 126. The overflow channel 126 is defined in the gap between the recycling section 110 and the water storing section 120.

The recycling section 110 is disposed apart from the water storing section 120. The wash water in the recycling section 110 and the wash water in the water storing section 120 are separated by walls. Since the capacities of the recycling section 110 and the water storing section 120 are fixed, the oversupplied wash water is discharged. The oversupplied-water channel 126 is defined between the recycling section 110 and the water storing section 120. The oversupplied-water channel 126 may be defined by a division wall 124 for separation from the recycling section 110 and a supplied water guide wall 125 for separation from the water storing section 120.

The overflow channel 126 is formed between the division wall 124 and the supplied water guide wall 125. The wash water oversupplied into the water storing section 120 flows down from the top. The wash water flowing down from the water storing section 120 drops through the overflow channel 126. The wash water flowing through the overflow channel 126 is discharged from the supply pipe connection port 130. The supply pipe connection port 130 includes a water softener connection port 131 and a recycling container connection port 133. Preferably, the overflow channel 126 is connected with the water softener connection port 131.

The tub 10 according to an exemplary embodiment of the present invention has the tub hole 10 formed through the side facing the case 100, the case 100 has the communicating hole 100a that communicates with the tub hole 10a, and the recycling section 110 and the water storing section 120 may be formed separately from the communicating hole 100a. The tub 10 has the tub hole 10a and is closed by the door 3. The air in the tub 10 is discharged to the outside through the tub hole 10a.

The case 100 has the communicating hole 100a that communicates with the tub hole 10a. The communicating hole 100a and the tub hole 10a may be connected by a pipe or a hose. For example, the tub hole 10a and the communicating hole 100a are connected by bringing the case 100 in contact with the tub 10. Air or wash water can flow through the tub hole 10a and the communicating hole 100a. A sealing member may be provided between the tub hole 10a and the communicating hole 100a to prevent leakage of air or wash water.

The recycling section 110 and the water storing section 120 are separated from the communicating hole 100a. For example, the communicating hole 100a is partially covered by the recycling section 110. The recycling section 110 may have a storage space larger than the water storing section 120. The communication hole 100a, the recycling section 110, and the water storing section 120 are separated by walls. For example, one side of the recycling section 110 may be recessed. The communicating hole 100a is formed at the recess. The wall surrounding the recycling section 110 has an inward-bending wall 141 that is curved to surround the communicating hole 100a.

One end of the inward-bending wall 141 may be extended upward and connected with a communicating wall 143 defining the recycling section 110. The upper portion of the communicating wall 143 is partially open and vertically formed such that the wash water oversupplied to the recycling section 110 can flow down. The inward-bending wall 141 extends to the communicating hole 100a and surrounds the communicating hole 100a. The communication hole 100a may be connected with a leaking water guide wall 145 formed over the water storing section 120.

A fixing cap 203 may be disposed between the tub hole 10a and the communicating hole 100a. The fixing cap 203 filters foreign substances that can flow between the tub hole 10a and the communicating hole 100a. The fixing cap 203 may be disposed in the tub hole 10a or the communicating hole 100a.

The recycling section 110 may have a recycling-communicating portion 111 with a side open so that oversupplied wash water or air is discharged, and the communicating hole 100a may be formed lower than the recycling-communicating portion 111 so that the wash water overflowing the recycling section 110 flows to the communicating hole 100a.

The communicating wall 143 is vertically elongated and is disposed along a side of the recycling section 100. The communicating wall 143 defines a side of the recycling section 110. The communicating wall 143 defines the recycling section 110 and an over-stored water discharge channel 144. The communicating wall 143 has the recycling-communicating portion 111 with a side open to allow wash water to overflow. The height of the recycling-communicating portion 111 depends on the capacity of the recycling section 110. The recycling-communicating portion 111 may be formed at the upper end of the communicating wall 143. The communicating wall 143 may be formed with the recycling-communicating portion 111 at a predetermined distance away from the top of the case 100.

The wash water flowing down from the recycling-communicating portion 111 is dropped and then discharged through the communicating hole 100a. The communicating hole 100a is formed lower than the recycling-communicating portion 111. The recycling-communicating portion 111 may be positioned higher than the communicating hole 100a or at least at the same height. The lower end of the communicating wall 143 may be connected with the inward-bending wall 141. The inward-bending wall 141 defines the recycling section 110 and the communicating wall 100a. The inward-bending wall 141 is connected with the water storing section 120, turning around the communicating hole 100a.

The leaking water guide wall 145 is disposed over the water storing section 120. The water leakage wall 145 is connected with the inward-bending wall 141. The water storing section 120 has an anti-siphon hole 165a to be described below. The wash water discharged through the anti-siphon hole 165a is guided to the communicating hole 100a by the leaking water guide wall 145. A wall joint 147 is where the inward-bending wall 141 and the leaking water guide wall 145 meet.

The case 100 may include a water supply wall 165 that bends so that wash water supplied from the outside can drop into the water storing section 120 after flowing upward. The water supply wall 165 partially bends. The water supply wall 165 forms a channel through which the wash water supplied from the outside flows to the water storing section 120. The water supply wall 165 is formed over the water storing section 120. The leaking water guide wall 145 is disposed under the water supply wall 165.

The water supply wall 165 has an anti-siphon hole 165a for preventing a siphon phenomenon and the anti-siphon hole 165a may be formed higher than or at the same height as the communicating hole 100a so that the wash water leaking through the anti-siphon hole 165a is dropped and discharged through the communicating hole 100a. The anti-siphon hole 165a can pass both air and wash water through it.

When wash water stops flowing inside from the outside, wash water can be discharged by a siphon effect. In order to prevent the siphon effect, the water supply wall 165 has the anti-siphon hole 165a through which the inside and the outside communicate with each other and air flows. The anti-siphon hole 165a is formed through the water supply wall 165. The wash water flowing through the water supply wall 165 may leak through the anti-siphon hole 165a. The leaking wash water flows to the communicating hole 100a.

Since the anti-siphon hole 165a is formed higher than the communicating hole 100a or at least at the same height, wash water can flow to the communicating hole 100a. Preferably, the leaking water guide wall 145 is formed to guide leaking water. The leaking water guide wall 145 defines the top of the water storing section. The leaking water guide wall 145 is disposed under the anti-siphon hole 165a. One side of the leaking water guide wall 145 is connected with the water supply wall 165 and the other side is connected with the inward-bending wall 141.

The case 100 may include an air discharge port 149 to discharge the air discharged from the recycling section 110, the air discharged from the water storing section 120, and the air discharged from the tub 10 through the communicating hole 100a, to the outside. The air in the recycling section 110 is discharged through the recycling-communicating portion 111. The air in the water storing section 120 is discharged through the anti-siphon hole 165a. The air in the tub 10 is discharged to the tub hole 10a and flows into the communicating hole 100a. The air discharged from the anti-siphon hole 165a and the communicating hole 100a is guided upward by the inward-bending wall 141.

The case 100 has the air discharge port 149. For example, the air discharge port 149 is formed at the lower portion of the case 100. The air in the case 100 can be discharged to the air discharge port 149 through between a condensing wall 181, which is described below, and the wall formed along the edge of the case 100.

Further, the external air may flow inside through the air discharge port 149 and flow into the tub 10 through the communicating hole 100a and may flow into the recycling section 110 or the water storing section 120. Since wash water is repeatedly supplied/discharged into/out of the recycling section 110 and the water storing section 120, air can also flow into/out of them. On the other hand, the air in the case 100 can flow into the tub 10 through the tub hole 10a and be discharged to the outside, when the door 3 is open.

The dish washer 1 according to an exemplary embodiment may include a recycling pipe 150 formed so that the wash water discharged from the recycling unit 110 flows to the sump 60 and the case 100 may include a recycling pipe connection portion 151 connected with the recycling pipe 150 and a recycling valve 153 opening/closing the recycling pipe connection portion 151.

The wash water discharged from the recycling section 110 flows through the recycling pipe 150. The wash water flowing through the recycling pipe 150 flows to the sump 60. The recycling pipe 150 guides the wash water in the recycling unit 110 to the sump 60. The recycling pipe 150 may be connected with the wash arm pipe 30. The wash arm pipe 30 communicates with the sump 60. The case 100 may include the recycling pipe connection portion 151 to which the recycling pipe 150 is connected. The recycling pipe connection portion 151 may be formed at the lower portion of the recycling section 110. The case 100 may have a recycling pipe 153 opening/closing the recycling pipe connection portion 151. The recycling valve 153 controls opening/closing of the recycling pipe connection portion 151.

The case 100 may include a water inlet port 161 connected with a pipe so that wash water supplied from the outside flows into the water storing section 120 and the supply pipe connection port 130 connected with a pipe so that the wash water in the water storing section 120 is discharged to the sump 60.

For example, the water supply pipe 41 may be connected to the water pipe of the water equipment in a house. The water flows through the water supply pipe 41 flows to the water storing section 120. The case 100 includes a water supply connection portion to which the water supply pipe 41 is connected. The wash water flowing in the water supply connection portion flows to the water supply wall 165. The case 100 may include a flow meter 163. The flow meter 163 measures the flow rate of the wash water flowing in the water inlet port 161. The flow meter 163 may be disposed between the water inlet port and the water supply wall 165.

The supply pipe connection port 130 may include the water softener connection port 131 for discharging wash water to a water softener 81 with a filter controlling minerals in wash water and the recycling container connection port 133 for discharging wash water to a recycling container 83 purifying the filter of the water softener 81. The water softener 81 softens wash water by controlling minerals in the wash water. Soft water contains less calcium and magnesium than hard water. The water softener 81 includes an ion resin filter. The recycling container 83 produces recycled water while periodically receiving wash water and purifies the ion resin filter by sending the recycled water to the softener 81.

The supply pipe connection port 130 may include the water softener connection port 131 discharging wash water to the water softener 81 and the recycling container connection port 133 discharging wash water to the recycling container 82.

The water storing section 120 may include a water discharge portion 121 that is open so that oversupplied wash water can overflow it, and the water softener connection port 131 may be formed lower than the water discharge portion 121 so that the wash water overflowing the water discharge portion 121 drops and flows to the discharge portion of the water softener 81.

The water discharge portion 121 is formed by partially opening the top of the water storing section 120. The wash water overflowing the water discharge portion 121 flows to the supply pipe connection port 130. Preferably, the wash water overflowing the water discharge portion 121 flows to the water softener connection port 131. The wash water overflowing the water discharge portion 121 flows to the overflow channel. The overflow channel 126 is defined by the division wall 124 and the supplied water guide wall 125. The water discharge portion 121 is formed higher than the water softener connection port 131. The water discharge portion 121 is formed under the leaking water guide wall 145. The water discharge portion 121 is formed such that the upper end of the supplied water guide wall 125 is spaced from the leaking water guide wall 145.

A dishwasher 1 includes a sump 60 where the wash water sprayed to the tub 10 collects and a drain pipe 71 that guides the wash water collecting in the sump 60 and the case 100 may include a drain pipe connection port 177 connected with the drain pipe 77 so that condensed water in the case 100 drops and flows into the drain pipe 71.

The drain pipe 71 is connected with the sump 60. The drain pipe 71 discharges wash water to the outside of the cabinet 2. The drain pipe 71 may be connected with, for example, a sewer. The wash water flowing through the drain pipe 71 may be wash water that has been contaminated. The case 100 is connected with the drain pipe 71. The case 100 includes the drain pipe connection port 177 to which the drain pipe 71 is connected. For example, the drain pipe connection port 177 may be divided into a portion through which wash water flows inside and a portion through which wash water is discharged. The drain pipe 71 may be a pipe connecting the sump 60 and the case 100. The drain pipe 71 may be a pipe connected with the case 100 and discharging wash water to the outside.

The drain pump 70 is connected with the drain pipe 71 and pressurizes wash water to discharge it. Condensed water is produced in the case 100. The condensed water may be discharged to the communicating hole 100a and flows into the tub 10. The condensed water can be discharged through the drain pipe 71. The condensed water can be discharged through the drain pipe 71.

The case 100 includes a drain wall 177 that bends so that the wash water supplied from the drain pipe connection port 177 flows upward and is then discharged downward and the drain wall 177 may have a condensed-water inlet 179a that is open so that the condensed-water in the case 100 flows inside through it.

The drain wall 177 through which the wash water flowing inside through the drain pipe connection port 177 flows is formed in the case 100. The drain wall 177 may be formed in a U-shape. The bending portion of the drain wall 177 is disposed upward. The condensed-water inlet 179a is formed over the drain wall 177.

The case 100 may include a condensing wall 181 surrounding the outer side of the recycling section 110 and connected with the condensed-water inlet 179a so that the condensed-water produced on the side of the recycling section 110 flows down into the condensed-water inlet 179a. The condensing wall 181 may bend substantially in an L-shape. The condensing wall 181 extends downward around the top and the side of the recycling section 110. The lower end of the condensing wall 181 is connected with the drain wall 177. The condensing wall 181 guides the condensed-water produced in the case 100 to the condensed-water inlet 179a.

The case 100 may include a drain check valve 183 disposed between the condensing wall 181 and the recycling section 110 and stopping the wash water flowing through the drain pipe 171 from flowing inside the condensing wall 181. The drain check valve 183 is disposed between the condensing wall 181 and the recycling section 110.

The condensed-water produced outside the recycling section 110 flows to the drain wall 177 through the condensed-water channel formed between the recycling section 110 and the condensing wall 181. The condensed-water check valve opens the condensed-water channel in order to allow condensed-water to flow down and keep flowing outside through the condensed-water inlet 179a. The condensed-water check valve stops the wash water flowing in the drain pipe connection port 177 from flowing into the condensed-water channel through the condensed-water inlet. The drain check valve 183 opens, when fluid flows down, and it closes, when fluid flows up.

A dishwasher 1 according to an exemplary embodiment may include a tub 10 to which wash water is sprayed and which has a tub hole 10a open to discharge internal air to the outside, a sump 60 where the wash water sprayed to the tub 10 collects, and a case 100 that has a storage space, where the wash water collecting in the sump 60 and flowing therein is stored, and has a communicating hole 100a that communicates with the tub hole 10a so that wash water leaking from the storage space is discharged down to the tub 10.

The dish washer 1 according to an exemplary embodiment includes a tub 10 having a tub hole 10a open to discharge internal air to the outside, a sump 60 collecting the wash water sprayed to the tub 10, a recycling section 110 having a storage space for storing the wash water collecting in the sump 60, and a case 100 having a communicating hole 100a, which communicates with the recycling section 110 and the tub hole 10a, and an over-stored water discharge channel 144 that guides wash water oversupplied to the recycling section 110 to the communicating hole 100a. A communicating wall 143 defines the recycling section 110 and the over-stored water discharge channel 144.

A dishwasher 1 according to an exemplary embodiment includes a tub 10 forming a dishwashing space and a sump 60 collecting the wash water sprayed to the tub 10, in which the wash water supplied from the outside and the wash water collecting in the sump 60 are separately stored and the spaces for the separation storage communicates with the communicating hole 100a open at the side of the tub 10.

Figure 2:
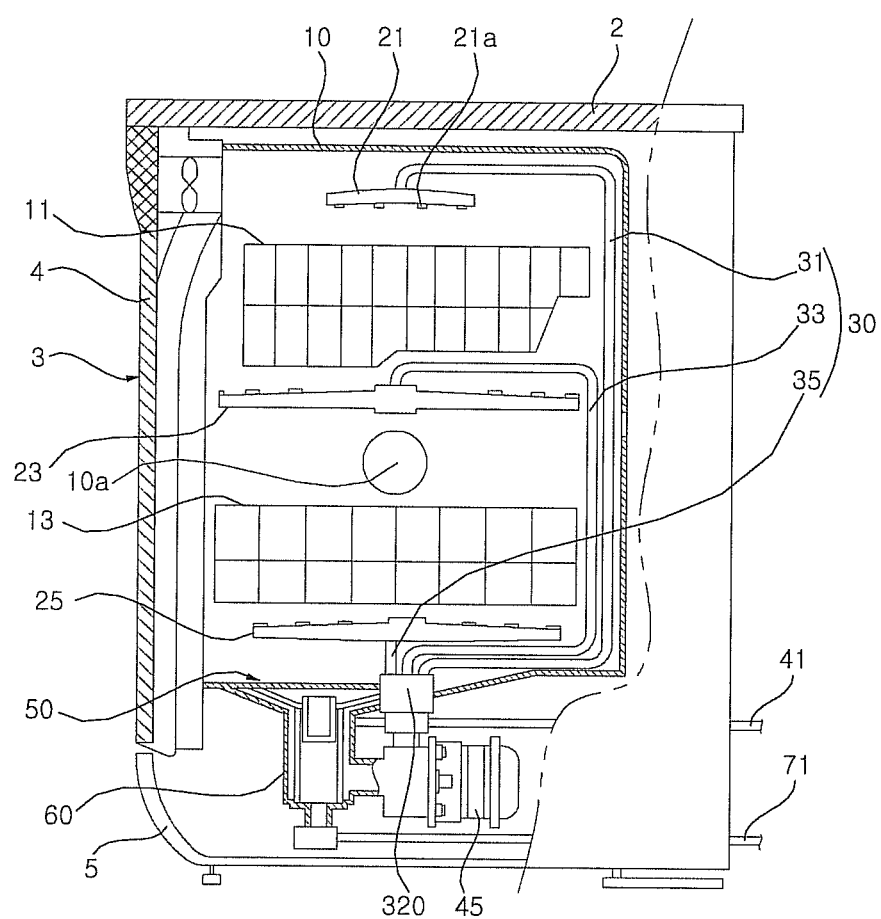
FIG. 2 is a side cross-sectional view of the dishwasher shown in FIG. 1.
Figure 3:
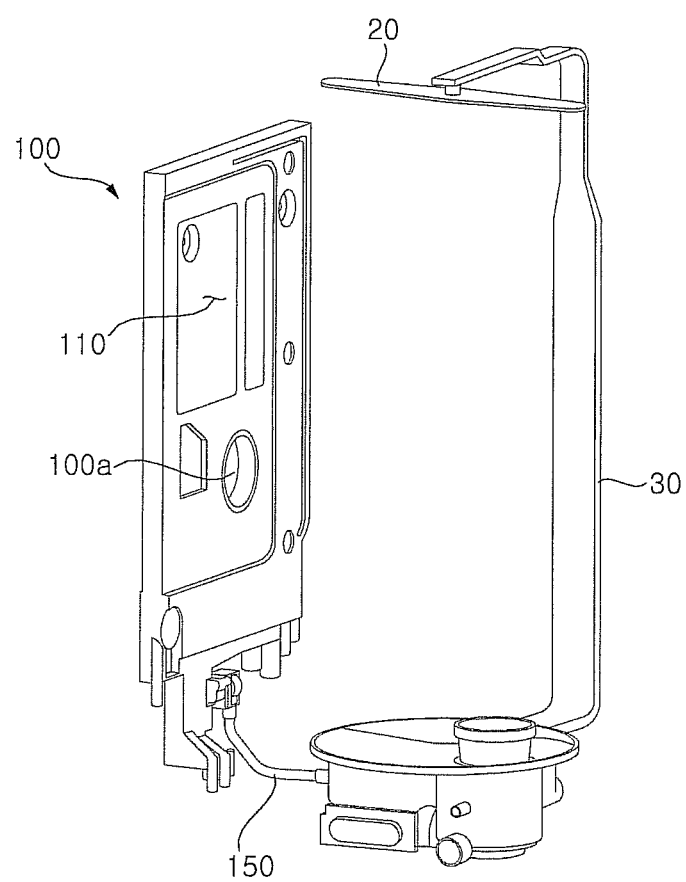
FIG. 3 is a perspective of a case and other components of the dishwasher shown in FIGS. 1 and 2.
Figure 4:
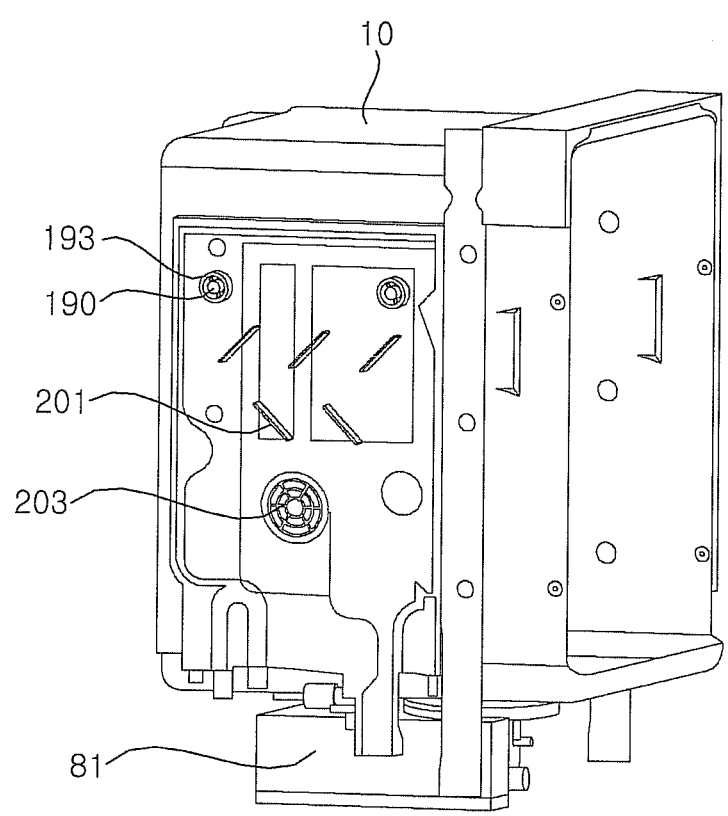
FIG. 4 is a perspective view of the case.

Referring to FIGS. 1 to 3, a cabinet 2 forms an exterior of the dishwasher 1 and provides a structure for accommodating parts. The front of the cabinet 2 is open. The tub 10 into which wash water is sprayed is disposed in the cabinet 2. A user puts dishes into the tub 10 through the door 3 that opens/closes the front of the tub 2. The door 3 is pivotably coupled to the front of the cabinet 2.

A plurality of racks may be provided. The rack may include a top rack 11 and a bottom rack 13. The wash water sprayed into the tub 10 collects into the sump 60. A filter assembly 50 filters foreign substances in wash water. The drain pipe 71 is connected with the sump 60. The drain pipe 71 discharges wash water collected in the sump 60. The drain pipe 71 is connected with the drain pump 70. The drain pump 70 pressurizes and sends wash water to the drain pipe 71.

The sump 60 is supplied with wash water from the outside. The sump 60 is connected with a wash arm pipe 30 through which the collected wash water flows to the wash arm 20. The sump 60 is disposed at the bottom of the tub 10. The sump 60 is equipped with the filter assembly 50 filtering foreign substances from the wash water. The case 100 is disposed outside the tub 10. The case 100 may be fastened to a side of the tub 10. In an exemplary embodiment, the case 100 is fastened to a side of the tub 10. The recycling section 110 is formed inside the case 100. The recycling section 110 may be defined by walls inside the case 100.

The recycling section 110 stores the wash water flowing from the sump 60 after collecting therein. The recycling section 110 discharges the stored wash water back to the sump 60. The recycling section 110 may be connected with a recycling pipe 150. The recycling pipe 150 is a pipe that is disposed between the recycling section 110 and the sump 60 and through which wash water flows. The water storing section 120 is formed inside the case 100. The water storing section 120 may be defined by walls. The water storing section 120 is separated from the recycling section 110.

The water storing section 120 stores wash water supplied from the external source. The water storing section 120 may be connected with a water supply pipe 41. The water supply pipe 41 is a pipe through which water supplied from, for example, the water equipment of a house flows. The water storing section 120 is connected with a supply pipe connection port 130. The supply pipe connection port 130 is a pipe through which the wash water in the water storing section 120 flows to the sump 60. The case 100 may have a structure with two sides, of which any one may be fastened to the tub 10 with the other(s) covering it. A communicating hole 100a may be formed through the side of the case 100 fastened to the tub 10.

The wash pump 45 pressurizes and sends the wash water in the sump 60 to the wash arm pipe 30. The wash arm pipe 30 is connected with the wash arm 20. The wash arm 20 includes nozzles spraying wash water. The wash water sprayed from the wash arm 20 washes dishes. The wash arm pipe 30 is connected with the wash pump 45. A plurality of wash arms 20 may be provided at predetermined heights.

For example, the wash arm 20 may include an upper arm 21 at the highest, a lower arm 25 at the lowest, and a middle arm 23 between the upper arm 21 and the lower arm 25. The wash arm pipe 30 may include an upper arm pipe 31, a middle arm pipe 33, and a lower arm pipe 35. The upper arm 21 receives wash water through the upper arm pipe 31 from the wash pump 45. The middle arm 23 receives wash water through the middle arm pipe 33 from the wash pump 45. The lower arm 25 receives wash water through the lower arm pipe 35 from the wash pump 45.

The wash water discharged from the wash pump 45 can be guided to at least one of the wash arm pipes 30 by a flow switch 320. The flow switch 320 is disposed between the wash arm pipes 30 and the wash pump 45.

Figure 8:
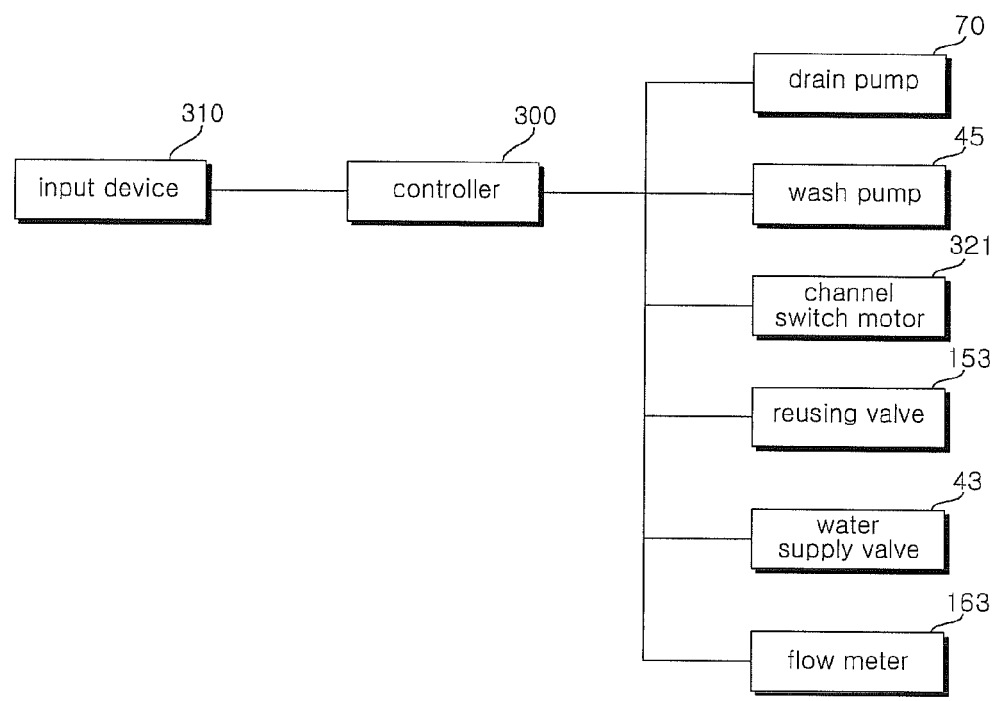
FIG. 8 is a block diagram showing the relationship between a control unit and other components according to an exemplary embodiment of the present invention.
Figure 9:
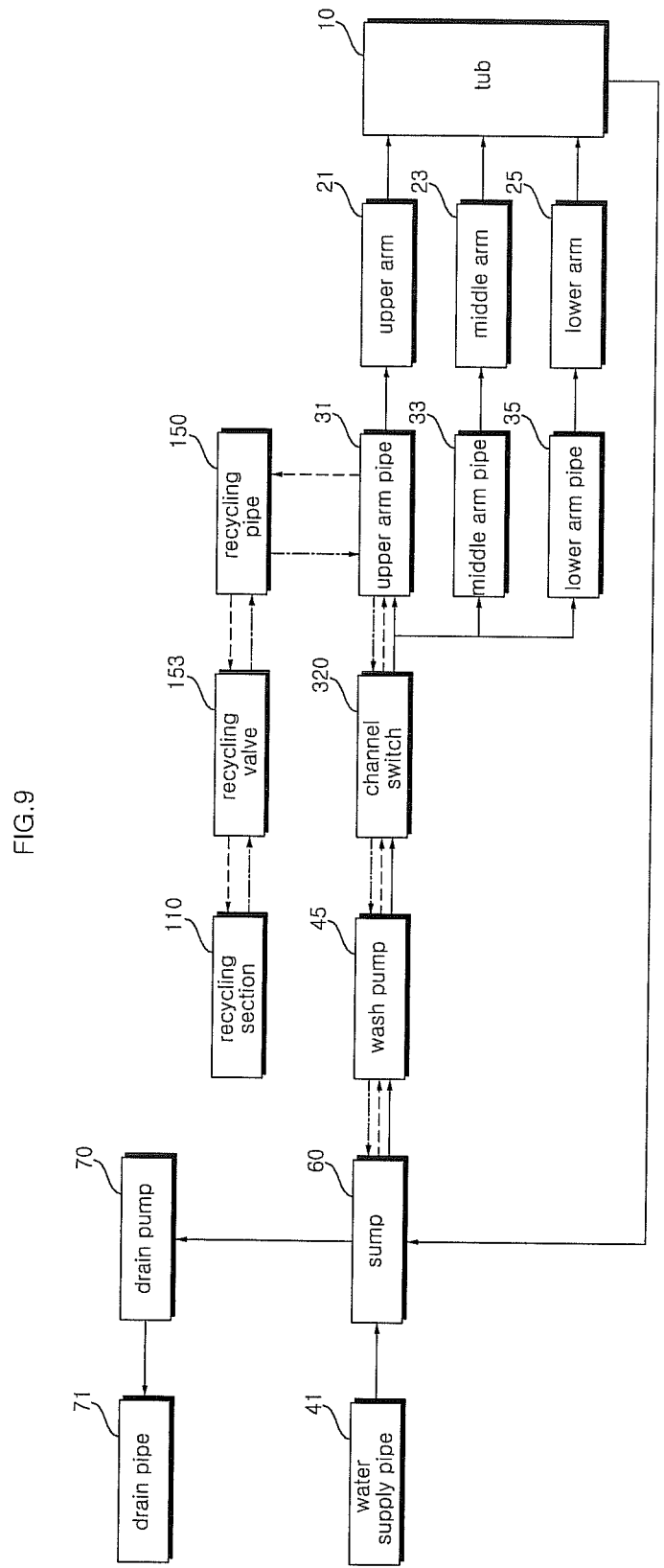
FIG. 9 is a block diagram of a wash water channel in a dishwasher according to an exemplary embodiment.

FIG. 8 is a block diagram showing the relationship between a controller 300 and other components according to an exemplary embodiment as broadly described herein and FIG. 9 is a block diagram of the flow of wash water in a dishwasher as embodied and broadly described herein, in which the solid lines the flow of wash water in a common wash cycle and rinse cycle, the dotted lines show a flow in which wash water is stored into the recycling section 110, and the one-dotted lines show a flow in which wash water is discharged from the recycling section 110 to be reused. Further, FIG. 10 is a perspective view of a rotary plate 323 of the channel switch 320 according to an exemplary embodiment.

Figure 10:
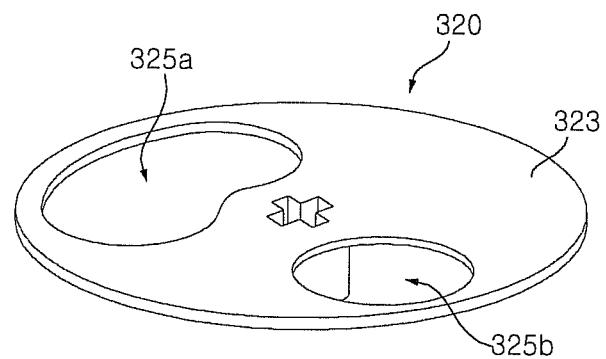
FIG. 10 is perspective view of a rotary plate of a flow switch according to an exemplary embodiment.

Referring to FIGS. 8 to 10, the dishwasher 1 includes a tub 10 forming a dishwashing space, a plurality of wash arms 20 disposed in the tub 10 and spraying wash water, a plurality of wash arm pipes 30 connected with the wash arms 20, respectively, and supplying wash water, a recycling pipe 150 diverging from at least one of the wash arm pipes 30, and a recycling section 110 storing the wash water supplied through the recycling pipe 150.

The tub 10 is disposed inside the cabinet 2 and forms a space where dishes are washed. The wash arms 20 are disposed in the tub 10. The wash arms 20 are disposed at predetermined heights and spray wash water. The wash arms 20 have nozzles. The nozzles are disposed at the end of the channel through which wash water flows.

The wash arm pipes 30 are pipes provided to supply wash water to the wash arms 20. The wash arm pipes 30 are provided for the wash arms 20, respectively. The channel switch unit 320 to be described below can open or close any one of the wash arm pipes 30. The recycling pipe 150 is connected with any one of the wash arm pipes 30. The wash water flowing through the wash arm pipes 30 can flow to the recycling pipe 150.

The recycling section 110 is connected with the recycling pipe 150. The wash water flowing through the wash arm pipes 30 flows into the recycling section 110 through the recycling pipe 150. The controller 300 measures the flow rate of wash water flowing inside from the water supply pipe 41 by controlling a flow meter 163. When the flow rate of wash water flowing inside is larger than a predetermined amount, the water supply pipe 43 is closed. The controller 300 controls a drain pump 70. The controller 300 discharges the wash water, which collects in the sump 60, to the outside by driving the drain pump 70 at a predetermined time. The drain pump 70 is connected with a drain pipe 71.

An input device 300 is connected with the controller 300. The input device 300 has a plurality of buttons and/or dials for a user to select operation options of the dishwasher 1.

The wash arm pipes 30 may include an upper arm pipe 31 connected with an upper arm 21 at the highest position in the wash arms 20 and the recycling pipe 150 can diverge from the upper arm pipe 31.

The wash arms 20 are provided at predetermined heights. The wash arms 20 are the upper arm 21 at the highest position, a lower arm 25 at the lowest position, and a middle arm 23 at the middle position. The wash arm pipes 30 are connected with the wash arms 20. The upper arm pipe 31 is a pipe for supplying wash water to the upper arm 21. The middle arm pipe 33 is a pipe for supplying wash water to the middle arm 23. The lower arm pipe 35 is a pipe for supplying wash water to the lower arm 25. The recycling pipe 150 may be connected with any one of the wash arm pipes 30. Preferably, the recycling pipe 150 is connected with the upper arm pipe 31.

The dishwasher 1 includes the channel switch 320 that controls the channel of wash water so that wash water is selectively supplied to the wash arm pipes 30 and the channel switch 320 can allow wash water to be supplied to the upper arm pipe 31, when the wash water is stored into the recycling section 110. The channel switch 320 connects the channel through which wash water flows with the upper arm pipe 31, when the wash water is stored into the recycling section 110.

The channel switching 320 controls wash water so that the wash water can selectively flow to the wash arms 20. The channel switch 320 selectively sends the wash water sent under pressure by the wash pump 450 to at least one of the upper arm pipe 31, the middle arm pipe 33, or the lower arm pipe 35.

The channel switch 320 includes a channel switch motor 321 generating torque and a rotary plate 323 controlling the flow of wash water while rotated by the channel switch motor 321. The rotary plate 323 selectively opens/closes a plurality of connection taps at the point where the wash arms 20 diverge.

A plurality of switch holes 325a and 325b is formed through the rotary plate 323. The switch holes 325a and 325b include a first switch hole 325a extending in a circumferential direction and a second switch hole 325b formed in a circle. The rotary plate 323 is rotated in stages by the channel switch motor 321. As the rotary plate 323 is rotated by the channel switch motor 321, the switch holes 325a and 325b of the rotary plate 323 move to the position corresponding to at least one of the connection taps and the wash water from the wash pump 45 is sprayed through at least one of the wash are pipes 30.

The channel switch motor 321 rotates the rotary plate 323 in stages by generating torque. It is preferable that the channel switch motor 321 is a step motor that progresses at a predetermined angle with every change in excitation state responding to an input pulse signal and stops and keeps a predetermined position without the excitation state changed. The controller 300 controls the channel switch motor 321. The controller 300 adjusts the position of the rotary plate 323 by driving the channel switch motor 321.

The dishwasher 1 includes the wash pump 45 that pressurizes and sends wash water to the wash arm pipes 30 and an upper arm nozzle 21a disposed on the upper arm 21 and spraying wash water, in which the wash pump 45 pumps wash water up to a height lower than the upper arm nozzle 21a, when the wash water is stored into the recycling section 110.

The wash pump 45 pressurizes the wash water collecting in the sump 60. The wash pump 45 pressurizes and sends the wash water to the channel switch 320. A plurality of upper arm nozzles 21a is disposed in the upper arm 21. The upper arm nozzles 21a are disposed at the end of the wash water channel through which wash water flows. The output of the wash pump 45 is controlled. The output of the wash pump 45 determines the flow rate of fluid that indicates the volume of liquid that can be sent out per unit time.

The output of the wash pump 45 determines the height to which wash water can be pumped up. The controller 300 controls the output of the wash pump 45. The controller 300 controls the height of pumped-up height of wash water. The controller 300 controls the lift of the wash pump 45 such that wash water is not sprayed from the upper arm nozzles 21a.

The dishwasher 1 may include a recycling valve 153 that is disposed in the recycling pipe 150 and opens/closes the channel between the wash arm pipe 30 and the recycling section 110.

The recycling valve 153 opens, when wash water flows to the recycling section 110. The recycling valve 153 opens, when wash water flows to the wash arm pipe 30. The recycling valve 153 closes, when storing of wash water is finished. The recycling valve 153 is controlled by the controller 300. The controller 300 opens the recycling valve 153, when wash water is stored. The controller 300 opens the recycling valve 153, when wash water is discharged. The controller 300 closes the recycling valve 153, when storing of wash water is finished. The controller 300 closes the recycling valve 153, when wash water needs to be sprayed to the tub 10.

A dishwasher 1 according to an exemplary embodiment includes a tub 10 forming a dishwashing space, a sump 60 where the wash water sprayed to the tub 10 collects, a recycling section 110 having a space for storing the wash water collecting in the sump 60, and a wash pump 45 pumping up wash water at a pressure, at which wash water is not sprayed from a wash arm 20, and is provided to the recycling section 110.

The wash pump 45 pressurizes the wash water in the sump 60 and is connected with the wash arm 20 and the recycling section 110 so that the pressurized wash water can flow to both of the wash arm 20 and the recycling section 110. The dishwasher 1 may include a controller 300 that controls the output of the wash pump 45 to pressurize wash water up to a pressure at which wash water is not sprayed from the wash arm 20, when wash water is stored in the recycling section 110.

Figure 11:
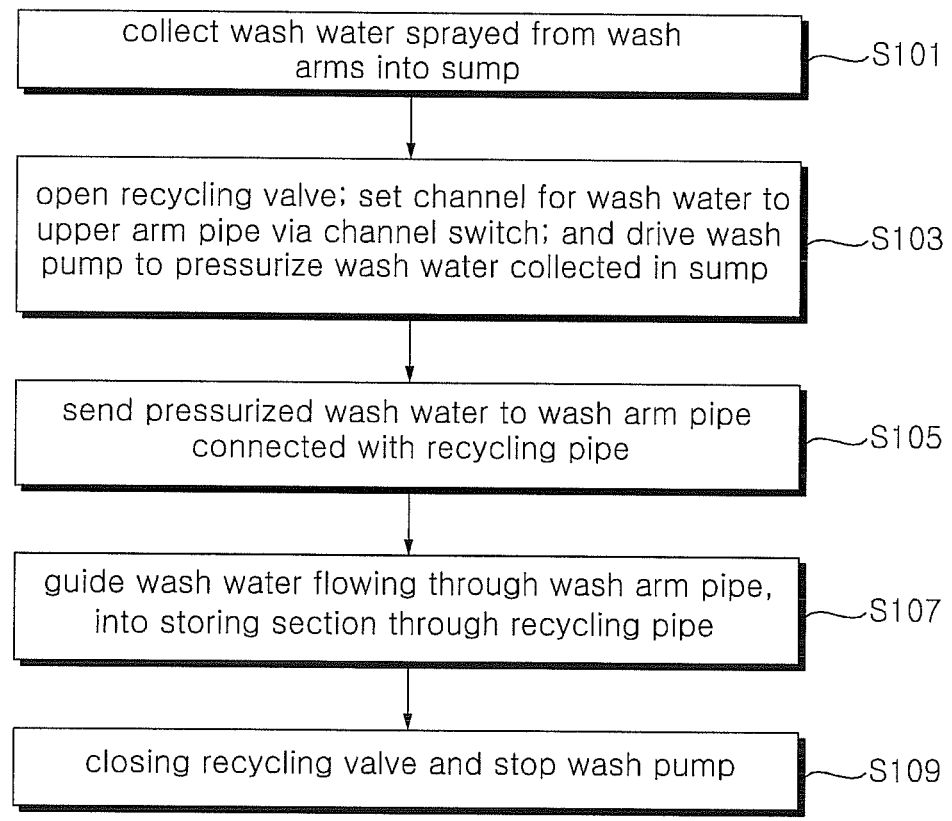
FIG. 11 is a flowchart of a control method for storing wash water according to an exemplary embodiment.

FIG. 11 is a flowchart illustrating a method P100 of storing wash water in a method of controlling the dishwasher 1 according to an exemplary embodiment as broadly described herein. Referring to FIG. 11, a method of controlling the dishwasher 1, which is a method of controlling the dishwasher 1 including a plurality of wash arms 20 disposed in a tub 10 and spraying wash water and a plurality of wash arm pipes 30 connected with the wash arms 20, respectively, includes a step of collecting wash water sprayed from the wash arms 20 into a sump 60 (S101), a step of driving a wash pump 45 that pressurizes the wash water collected in the sump 60 (S103), a step of sending the pressurized wash water to the wash arm pump 30 connected with a recycling pipe 150 in the wash arm pipes 30 (S105), and a step of storing the wash water flowing through the wash arm pipe 30 to a recycling section 110 connected with the recycling pipe 150 (S107).

The method P100 of storing wash water into the recycling section 110 may be performed after a wash cycle or a rinse cycle. In certain embodiments, it is performed after the final rinse cycle in which relatively clean water is collected in the sump 60 and thus is most easily re-used.

The wash water pressurized by the wash pump 45 in the rinsing is discharged through the wash arm 20. The method P100 of storing wash water may start with the step (S101) in which the wash water sprayed from the wash arm 20 is sprayed to the tub 10 and collected into the sump 60. The controller 300 recognizes a predetermined time to store wash water. For example, the controller 300 can recognize it as a step of storing wash water, after the final rinse cycle is finished.

The controller 300 can determine that wash water has collected in the sump 60, when a predetermined time passes after the operation of the wash pump 45 finishes. Thereafter, the controller 300 performs a step (S103) of pumping up wash water by driving the wash pump 45. A plurality of wash arm pipes 30 may be provided, and in an exemplary embodiment, any one of the wash arm pipes 30 is connected with the recycling pipe 150. The pressurized wash water is discharged from the wash pump 45 and then undergoes the step S105 in which it flows through the wash arm pipe 30 connected with the recycling pipe 150. The wash water flowing through the wash arm pipe 30 flows to the recycling pipe 150 connected with the wash arm pipe 30 and undergoes the step S107 in which it is stored in the recycling section 110.

The method of controlling the dishwasher 1 according to an exemplary embodiment may include the step S103 of opening the recycling valve 153 that opens/closes the channel of the recycling pipe 150 so that the wash water flowing through the wash arm pipe 30 can flow to the recycling pipe 150. The controller 300 gives the recycling valve 153 instructions to open and close. The controller 300 opens the recycling valve 153, when recognizing that it is the time to store wash water, and it closes the recycling valve 153, when storing of wash water is finished.

The method of controlling the dishwasher 1 according to an exemplary embodiment may include a step of closing the recycling valve 153 and stopping the wash pump 45 (S109), after performing the step of storing wash water into the recycling section 110 (S107). The controller 300 closes the recycling valve 153, when storing of wash water is finished (S203).

The controller 300 can recognize that storing is finished, when a predetermined condition is satisfied. For example, the controller 300 may determine it by sensing the flow rate of wash water flowing through the recycling pipe 150. Further, for example, the controller 300 may determine that storing is finished, when a predetermined time passes.

The controller 300 controls the operation of the wash pump 45. The controller 300 may stop the wash pump 45, when a predetermined time passes. As another example, the controller 300 stops the wash pump 45, when a predetermined amount of wash water flows into the recycling section 110 (S109).

The method of controlling the dishwasher 1 according to an exemplary embodiment may include a switching step of controlling the channel switch 320 so that the wash water from the wash pump 45 flows to the upper arm pipe 31 connected with the upper arm 21 at the highest position in the wash arms 20 (S103). In the step of driving the wash arm (S103), the controller 300 controls the output of the wash pump 45 to a level at which wash water is not sprayed from the upper arm 21.

The channel switch 320 can be set such that wash water flows to the upper arm pipe 31. The controller 300 drives the channel switch 320. The controller 300 drives the channel switch motor 321. The controller 300 sets the direction of a channel by operating the channel switch motor 321 as much as needed. In an exemplary embodiment, when wash water is stored into the recycling section 110, the controller 300 controls the channel switch 320 such that wash water flows to the upper arm pipe 31.

Figure 12:
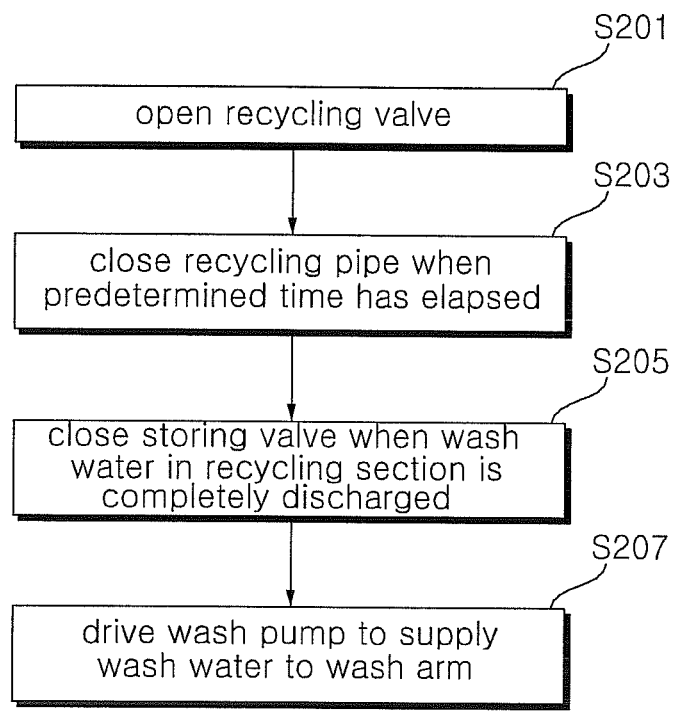
FIG. 12 is a flowchart of a control method for recycling wash water according to an exemplary embodiment.

FIG. 12 is a flowchart illustrating a method P200 of recycling wash water in a method of controlling a dishwasher 1 according to an exemplary embodiment as broadly described herein.

Referring to FIG. 12, in a method of controlling the dishwasher 1 including a wash arm 20 disposed in a tub 10 and spraying wash water and a wash arm pipe 30 connected with the wash arm 20 to supply wash water to the wash arm 20, the method of controlling the dishwasher 1 according to an exemplary embodiment includes a step of opening a recycling valve 153 that opens/closes a recycling pipe 150 connected with a recycling section 110 storing wash water, which is sprayed to the tub 10 and collected in a sump 60 (S201), a step of collecting the wash water, which flows in the recycling pipe 150, into the sump 60 through the wash arm pipe 30 connected with the recycling pipe 150 (S203), a step of closing the recycling valve 153 when a predetermined time passes (S205), and a step of driving a wash pump 45 to pressurize and send the wash water in the sump 60 to the wash arm 20 (S207).

The recycling section 110 is connected with the recycling pipe 150. The recycling pipe 150 is connected with the wash arm pipe 30. Preferably, the recycling pipe 150 is connected with the upper arm pipe 31. The method P200 of recycling wash water may start with the step of opening the recycling valve 153 (S201). For example, the point in time at which wash water is re-used may be a main wash step of putting in a detergent or may be a pre-wash step of removing foreign substances on dishes before putting in the detergent.

The point of time at which wash water is re-used may be set in advance. The controller 300 opens the recycling valve 153, when recognizing the point of predetermined reuse time. When the recycling valve 153 is opened, the wash water in the recycling section 110 flows through the recycling pipe 150. The recycling pipe 150 is connected with the wash arm pipe 30 and the wash arm pipe 30 is connected with the sump 60. The wash water flowing through the recycling pipe 150 undergoes the step S203 in which it collects into the sump 60 through the wash arm pipe 30.

The controller 300 recognizes that the wash water has been discharged, when a predetermined time passes after opening the recycling valve 153. The plan of using wash water may depend on the time to reuse it. Accordingly, not only the case of discharging wash water at a time, but also a way of discharging wash water in steps may be applied.

The controller 300n performs the step of closing the recycling valve 153 (S205), when a predetermined condition is satisfied. The step of closing the recycling valve 153 (S205) may be performed before the step of driving the wash pump 45 (S207).

The controller 300 recognizes that wash water has collected in the sump 60, when predetermined conditions are satisfied. The predetermined condition may be the flow rate of wash water or the open time of the recycling valve 153. Thereafter, the controller 300 performs a predetermined next cycle. For example, the predetermined next cycle may be a main wash cycle, a pre-wash cycle, or a rinse cycle. The controller 300 performs the step of supplying wash water to the wash arm 20 by driving the wash pump 45 (S207).

The operation of the dishwasher 1 with the configuration described above according to an exemplary embodiment is described hereafter.

Wash water is sprayed and discharged to the tub 10 from the wash arm 20 by the wash pump. The wash water sprayed to the tub 10 drops and collects into the sump 60. The wash water collecting in the sump 60 can flow to the recycling pipe 150 by the wash pump 45. The wash water flowing through the recycling pipe 150 is stored into the recycling section 110 through the recycling pipe connection port 151.

When the wash water is stored in the recycling section 110, the air in the recycling section 110 is discharged through the recycling-communicating portion 111. On the other hand, excess wash water oversupplied to the recycling section 110 overflows through the recycling-communicating portion 111. The wash water overflowing through the recycling-communicating section 111 flows down into the tub 10 through the communicating hole 100a. Further, the air discharged through the recycling-communicating portion 111 is discharged to the air discharge port 149.

The condensed-water on the side of the recycling section 110 flows down along the condensing wall 181 and is then discharged to the condensed-water inlet 179a. Further, the wash water in the sump 60 may be pressurized and discharged to the outside by the drain pump 70. The wash water flows into the drain pipe connection port 177 through the drain pipe 71. The wash water is discharged to the outside together with the condensed-water flowing inside through the condensed-water inlet 179a. Further, the wash water supplied from the outside flows into the water inlet port 161 through the water supply pipe 41. The wash water flows along the water supply wall 165 and is then stored into the water storing section 120. A siphon effect can be prevented by the anti-siphon hole 165a. Wash water may leak through the anti-siphon hole 165a, but the leaking wash water is discharged to the tub 10 through the communicating hole 100a.

When the wash water stored in the water storing section 120 exceeds a predetermined water level, it drops through the water discharge portion 121 and flows to the water softener connection port 131. The wash water discharged from the water softener connection port 131 flows to the sump 60 through the water softener 81. The recycling container connection port 133 is formed at the bottom of the water storing section 120 and periodically supplies wash water to the recycling container 83. The fastening holes 191 are formed at one side of the case 100 for fastening to the tub 10. Further, leakage of water through the fastening hole 191 can be prevented by the waterproofing walls 193.

The case 100 may store wash water collected in the sump 60 and may discharge the stored wash water, if necessary, such that wash water can be reused. Accordingly, the consumption of wash water may be reduced. Further, since the case 100 may be reduced in size and weight by integrally forming the water storing section 120 and the recycling section 110, the size of the entire dishwasher 1 may be reduced. Further, it may be possible to save energy for heating wash water, because the wash water reaches the room temperature, when kept for a long time at the room temperature.

Further, the wash water pressurized by the wash pump 45 is sprayed from the wash arm 20 and discharged to the tub 10. The wash water sprayed to the tub 10 drops and collects into the sump 60. When the controller 300 recognizes that it is the step of storing wash water, it opens the recycling valve 153 and sets a channel so that wash water can flow to the upper arm pipe 31 by driving the channel switch motor 321. Thereafter, the controller 300 drives the wash pump 45.

However, the wash water can flow to both of the upper arm pipe 31 and the recycling pipe 150. That is, when the output of the wash pump 45 is too high, wash water is sprayed to the tub 10 through the upper arm 21. Further, when the output of the wash pump 45 is too low, a sufficient amount of water cannot be stored in the recycling section 110. Accordingly, the controller 300 needs to drive the wash pump 45 such that water is not discharged from the upper arm pipe 31 or the water level is lower than the upper arm nozzle 21a.

The controller 300 finishes storing, when a predetermined time passes or a predetermined amount of wash water is stored in the recycling section 110. The controller 300 closes the channel by operating the recycling valve 153 and finishes storing by stopping the wash pump 45.

According to a method of recycling the stored wash water, the controller 300 opens the recycling valve 153 at a predetermined time. For example, the controller 300 opens the recycling valve 153, before the wash and/or rinse step starts. When the recycling valve 153 is opened, the wash water in the recycling section 110 is dropped and discharged by the gravity. The wash water is discharged to the sump 60 through the upper arm pipe 31. When the wash water is completely discharged from the recycling section 110, the controller 300 closes the channel formed by the recycling pipe 150 by driving the recycling valve 153. Thereafter, the controller 300 performs the wash cycle by driving the wash pump 45.

It may be possible to save wash water by recycling the wash water in a dishwasher as described above. Further, it may be possible to save energy for heating wash water, because the wash water approaches room temperature when kept for a long time at room temperature.

A dishwasher and method of using the same, as embodied and broadly described herein, may reduce the consumption of water by storing used wash water, and if necessary, recycling it.

A dishwasher and method of using the same, as embodied and broadly described herein, may reduce the size of a dishwasher by making a wash water management space in one unit.

A dishwasher and method of using the same, as embodied and broadly described herein, may simplify the manufacturing process by integrating a hose or a pipe through which wash water flows with a storage space.

A dishwasher according to an embodiment as broadly described herein may include a tub forming a dishwashing space; a case disposed outside the tub and storing wash water; a reusing section disposed inside the case and forming a space for storing wash water sprayed to the tub; and a water storing section disposed inside the case, forming another space separated from the space formed by the reusing section, and storing wash water supplied from the outside.

The dishwasher may include fastening members that fix the case to the tub, and the case may include waterproofing walls disposed around fastening holes in which the fastening members are inserted.

The reusing section and the water storing section may be disposed apart from each other and may define an oversupplied water channel, through which wash water oversupplied and overflowing the water storing section flows, therebetween.

A tub hole may be formed at the side of the tub which faces the case, a communicating hole that communicates with the tub hole may be formed at the case, and the reusing section and the water storing section may be separated from the communicating hole.

The reusing section may have a reusing-communicating portion that is open at one side and discharges oversupplied wash water or air, and the communicating hole may allow wash water overflowing through the reusing-communicating portion to flow and may be formed lower than the reusing-communicating portion.

The case may include a water supply wall that bends so that wash water supplied from the outside can drop into the water storing section after flowing upward.

The water supply wall may have an anti-siphon hole through which air or wash water can be discharged, and the anti-siphon hole may be formed at the same height as or higher than the communicating hole.

The case may have an air discharge port to discharge the air discharged from the reusing section, the air discharged from the water storing section, and the air discharged from the tub through the communicating hole, to the outside.

The dishwasher may include a reusing pipe that guides wash water discharged from the reusing section to the sump, in which the case may include: a reusing pipe connection port connected with the reusing pipe; and a reusing valve opening/closing the reusing pipe connection port.

The case may include a water inlet port to which a pipe that guides wash water supplied from the outside to the water storing section is connected; and a supply pipe connection port to which a pipe that guides wash water in the water storing section to the sump is connected.

The supply pipe connection port may include a water softener connection port for discharging wash water to a water softener controlling mineral in wash water; and a recycling container connection port for discharging wash water to a recycling container purifying the filter of the water softener.

The water storing section may have a water discharge portion that is open so that oversupplied wash water can overflow, and the water softener connection port may be disposed lower than the water discharge portion and wash water overflowing through the water discharge portion may flow into the water softener connection port.

The dishwasher may also include a sump where wash water sprayed to the tub collects; and a drain pipe that guides the wash water collecting in the sump to the outside, in which the case includes a drain pipe connection port that communicates with the drain pipe.

The case may include a drain wall that bends so that the wash water supplied from the drain pipe connection port flows upward and is then discharged downward, and the drain wall may have a condensed-water inlet that is open so that condensed-water in the case flows inside.

The case may include a condensed-water wall that surrounds the outer side of the reusing section and guides condensed-water produced on a side of the reusing section to the condensed-water inlet.

The case may include a drain check valve that is disposed between the condensed-water wall and the reusing section and prevents wash water flowing through the drain pipe from flowing inside the condensed-water wall.

A dishwasher according to another embodiment as broadly described herein may include a tub having a tub hole that is open to discharge internal air to the outside; a sump collecting wash water sprayed to the tub; a reusing section having a storage space for storing the wash water collecting in the sump; and a case having an over-stored water discharge channel forming a communicating hole that communicates with the reusing section and the tub hole and guiding wash water oversupplied to the reusing section to the communicating hole.

A dishwasher according to another embodiment as broadly described herein may include a tub forming a dishwashing space; and a sump collecting wash water sprayed to the tub, in which the wash water supplied from the outside and the wash water collecting in the sump are separately stored and spaces for the separation storage communicate with a communicating hole that is open through the side of the tub.

In a dishwasher and a method of controlling the same, as embodied and broadly described herein, since it is possible to store used wash water and reuse it, if necessary, consumption of wash water is reduced.

In a dishwasher and a method of controlling the same, as embodied and broadly described herein, since it is possible to generally manage wash water with one case, it is possible to greatly reduce the size of the entire dishwasher.

In a dishwasher and a method of controlling the same, as embodied and broadly described herein, since it is possible to integrally form a channel through which air is discharged from a storage space and a channel for leaking wash water with a case, it is possible to simplify the manufacturing process and reduce the manufacturing cost.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dishwasher, comprising:
a cabinet forming an external appearance of the dishwasher;
a tub disposed in the cabinet and forming a dishwashing space;
a sump disposed at a bottom of the tub to collect wash water;
a case disposed between the tub and the cabinet;
a recycling section provided inside the case, and outside the tub, and the recycling section forming a space for storing wash water to be collected in the sump; and
a storing section provided inside the case, and outside the tub, and the storing section forming another space, separate from the space formed by the recycling section, the storing section storing wash water supplied from an external source,
wherein wash water in the recycling section is stored to be reused for washing or rinsing, and
wherein wash water in the storing section is stored to be supplied to the sump for being sprayed in the tub,
wherein the recycling section and the storing section are disposed apart from each other, and wherein an overflow channel is defined between the recycling section and the storing section to receive excess wash water supplied from the external source to the storing section, and
wherein the overflow channel defines a boundary between the recycling section and the storing section.

2. The dishwasher of claim 1, further comprising at least one fastener that fixes the tub and the case, wherein the case includes at least one fastening hole formed therein, and waterproofing walls disposed around the at least one fastening hole, wherein at least one fastener is received in the at least one fastening hole to fix the tub and the case to each other.

3. The dishwasher of claim 1, wherein the overflow channel is defined by a division wall for separation from the recycling section and a supplied water guide wall for separation from the water storing section.

4. The dishwasher of claim 3, further comprising:
a tub hole formed in the tub, at a position on the tub facing the case; and
a communicating hole formed in the case so as to communicate with the tub hole, wherein the recycling section and the storing section are separated from the communicating hole.

5. The dishwasher of claim 4, wherein the recycling section has a recycling-communicating portion that is open at one side and discharges excess wash water or air, and the communicating hole is formed lower than the recycling-communicating portion to allow excess wash water overflowing through the recycling-communicating portion to flow therethrough.

6. The dishwasher of claim 5, further comprising a water supply wall formed on the case, wherein the water supply wall includes at least one bend that guides wash water supplied from the external source upward, and then down into the storing section.

7. The dishwasher of claim 6, further comprising an anti-siphon hole formed in the water supply wall to selectively discharge air or wash water, wherein the anti-siphon hole is formed at a height that is greater than a height of the communicating hole.

8. The dishwasher of claim 7, further comprising an air discharge port formed in the case to discharge air discharged from the recycling section, air discharged from the storing section, and air discharged from the tub through the communicating hole, to an outside of the dishwasher.

9. The dishwasher of claim 3, further comprising a recycling pipe that guides wash water discharged from the recycling section to the sump, wherein the case includes:
a recycling pipe connection port connected with the recycling pipe; and
a recycling valve opening/closing the recycling pipe connection port.

10. The dishwasher of claim 9, wherein the case includes:
an inlet port configured to be connected to a pipe that guides wash water supplied from the external source to the storing section; and
a supply pipe connection port connected to a pipe that guides wash water in the storing section to the sump.

11. The dishwasher of claim 10, wherein the supply pipe connection port includes:
a water softener connection port configured to discharge wash water to a water softener; and
a recycling container connection port configured to discharge wash water to a recycling container purifying a filter of the water softener.

12. The dishwasher of claim 11, wherein the storing section includes a discharge portion that is open to allow excess wash water to overflow, and
the water softener connection port is disposed lower than the discharge portion, and excess wash water overflowing through a water discharge portion flows into the water softener connection port.

13. The dishwasher of claim 10, further comprising:
a drain pipe that guides wash water collected in the sump to an outside of the dishwasher,
wherein the case includes a drain pipe connection port that communicates with the drain pipe.

14. The dishwasher of claim 13, wherein the case further includes a drain wall including at least one bend so that wash water supplied from the drain pipe connection port flows upward and is then discharged downward, and wherein the drain wall includes a condensed-water inlet that is open to guide condensed-water in the case.

15. The dishwasher of claim 13, wherein the case further includes a condensed-water wall that surrounds an outer periphery of the recycling section and guides condensed-water generated at the outer periphery of the recycling section to the condensed-water inlet.

16. The dishwasher of claim 15, wherein the case further includes a drain check valve provided between the condensed-water wall and the recycling section that prevents wash water flowing through the drain pipe from flowing into a channel defined by the condensed-water wall.

* * * * *